United States Patent
Philbrick et al.

(10) Patent No.: US 11,757,633 B1
(45) Date of Patent: Sep. 12, 2023

(54) AUTOMATION AND MANAGEMENT OF PUBLIC KEY INFRASTRUCTURE

(71) Applicant: United Services Automobile Association (USAA), San Antonio, TX (US)

(72) Inventors: Ashley Raine Philbrick, San Antonio, TX (US); Ryan Thomas Russell, The Colony, TX (US); David Joaquin Harris, San Antonio, TX (US); Sacha Melquiades De'Angeli, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 91 days.

(21) Appl. No.: 17/135,150

(22) Filed: Dec. 28, 2020

Related U.S. Application Data

(60) Provisional application No. 62/955,170, filed on Dec. 30, 2019.

(51) Int. Cl.
*H04L 9/08* (2006.01)
*H04L 9/32* (2006.01)
*G06F 9/455* (2018.01)

(52) U.S. Cl.
CPC .......... *H04L 9/0891* (2013.01); *H04L 9/3263* (2013.01); *G06F 9/455* (2013.01)

(58) Field of Classification Search
None
See application file for complete search history.

(56) References Cited

U.S. PATENT DOCUMENTS

| | | | | |
|---|---|---|---|---|
| 10,404,477 | B1* | 9/2019 | Deck | H04L 9/3247 |
| 10,601,806 | B1* | 3/2020 | Varvarezis | H04L 9/3247 |
| 2006/0173787 | A1* | 8/2006 | Weber | G06F 21/105 |
| | | | | 705/59 |
| 2010/0169963 | A1* | 7/2010 | Kleinpeter | H04L 63/062 |
| | | | | 713/182 |
| 2019/0260599 | A1* | 8/2019 | Williams | H04L 9/3268 |
| 2019/0386969 | A1* | 12/2019 | Verzun | G06F 21/606 |
| 2020/0382324 | A1* | 12/2020 | Pierscieniak | G06F 9/451 |

OTHER PUBLICATIONS

Israel Levy, 2016: Time for Security to Take its Head out of the "Sand" (box), Infosecurity Magazine, Apr. 29, 2016, https://www.infosecurity-magazine.com/opinions/security-take-its-head-out-of-the/, 2 pgs.

* cited by examiner

*Primary Examiner* — Brandon Hoffman
(74) *Attorney, Agent, or Firm* — Fletcher Yoder, P.C.

(57) ABSTRACT

A containerization engine is configured to host one or more containers, determine one or more digital certificates associated with the one or more containers, apply metadata to the digital certificates, and generate a database that includes a plurality of entries. Each of the plurality of entries is indicative of a relationship between at least a portion of the metadata, a digital certificate of the one or more digital certificates, and a user of the one or more containers. Furthermore, the containerization engine is configured perform a certificate rotation using the database.

20 Claims, 1 Drawing Sheet

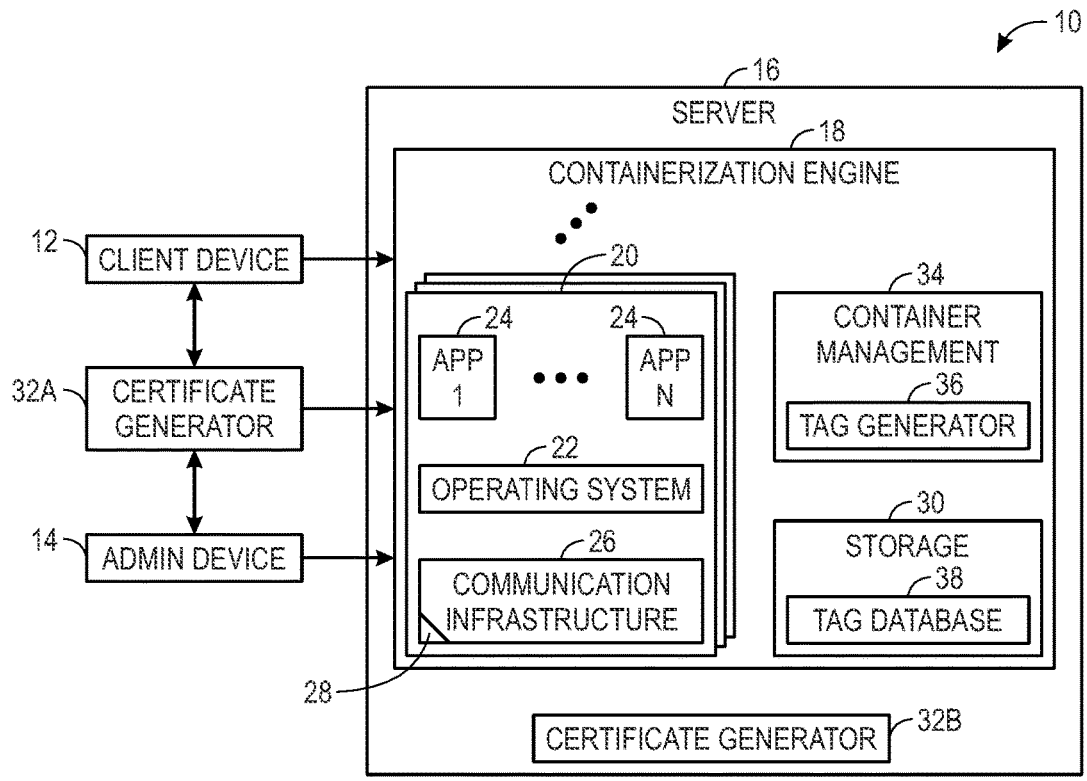
FIG. 1
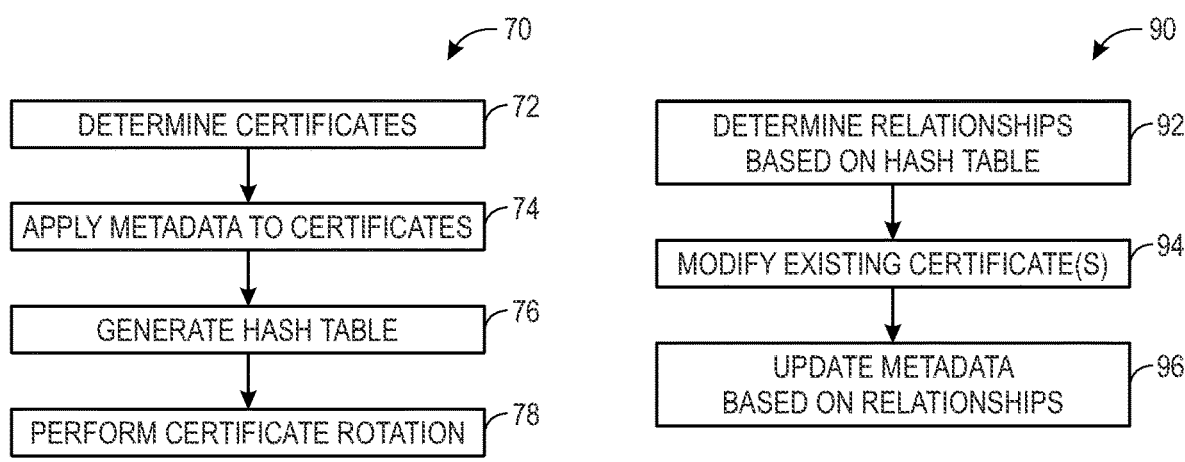
FIG. 2
FIG. 3 ial examples, ranges, and/or percentages disclosed herein are also to be considered as non-limiting.

AUTOMATION AND MANAGEMENT OF PUBLIC KEY INFRASTRUCTURE

CROSS-REFERENCE TO RELATED APPLICATION

The present disclosure is related to, and claims priority to, U.S. Provisional Patent Application Ser. No. 62/955,170, titled "Automation and Management of Public Key Infrastructure," which was filed on Dec. 30, 2019, and which is herein incorporated by reference in its entirety for all purposes.

BACKGROUND

The field of the disclosure generally relates to the management of digital certificates (e.g., public key certificates) in containers.

Containers may be used to provide operating system level virtualization. For example, containers may be utilized to enable multiple users to use multiple operating systems or applications that are contained in a single package (e.g., a container). Digital certificates are electronic documents that are utilized to prove ownership of a public key that can be used to establish secure communication (e.g., encrypted communication), for example, over the Internet. Digital certificates may be acquired by users over time, including users of containers. However, it can be difficult to manage and/or keep track of digital certificates associated with particular users or operating systems of containers. When containers have expired certificates or certificates that are no longer valid, digital security issues may be likelier to occur. For example, containers and users of containers may face an increased susceptibility to hacking. More specifically, when certificates expire, users may no longer be able to securely communicate (e.g., via encrypted pathways), which may make a container less secure and more susceptible to hacking.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a containerization engine is configured to host one or more containers, determine one or more digital certificates associated with the one or more containers, apply metadata to the digital certificates, and generate a database that includes a plurality of entries. Each of the plurality of entries is indicative of a relationship between at least a portion of the metadata, a digital certificate of the one or more digital certificates, and a user of the one or more containers. Furthermore, the containerization engine is configured to perform a certificate rotation using the database.

In another embodiment, a non-transitory computer-readable medium includes instructions that, when executed by one or more processors, cause the one or more processors to host one or more containers, determine one or more digital certificates associated with the one or more containers, apply metadata to the digital certificates, and generate a database that includes a plurality of entries. Each of the plurality of entries is indicative of a relationship between at least a portion of the metadata, a digital certificate of the one or more digital certificates, and a user of the one or more containers. Furthermore, the instructions, when executed, also cause the one or more processors to perform a certificate rotation using the database.

In yet another embodiment, a computer-implemented method includes hosting one or more containers, determining one or more digital certificates associated with the one or more containers, applying metadata to the one or more digital certificates, and generating a database comprising a plurality of entries. Each of the plurality of entries is indicative of a relationship between at least a portion of the metadata, one digital certificate of the one or more digital certificates, and a user of the one or more containers. The computer-implemented method also includes performing, via the one or more processors, a certificate rotation using the database.

DRAWINGS

These and other features, aspects, and advantages of the present disclosure will become better understood when the following detailed description is read with reference to the accompanying drawings in which like characters represent like parts throughout the drawings, wherein:

FIG. 1 depicts a block diagram of a container system, in accordance with aspects of the present disclosure;

FIG. 2 is a flowchart of a process for managing digital certificates associated with the container system of FIG. 1, in accordance with aspects of the present disclosure; and FIG. 3 is a flowchart of a process for performing a certificate rotation, in accordance with aspects of the present disclosure;

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. The terms "optional" or "optionally" mean that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device" and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable nonvolatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

In general, the present disclosure relates to managing digital keys associated with containers. In particular, the techniques discussed herein may be used to implement digital certificate rotations in container environments, which may increase online security associated with containers. For example, as discussed below, metadata (e.g., tags) may be associated with digital certificates associated with applications of one or more operating systems implemented via a container. The metadata may be utilized to establish a data structure such as a hash table that defines associations between particular digital certificates, metadata, containers, and users. The data structure may be utilized to implement a certificate rotation in which existing certificates are modified or replaced by other certificates. As described herein, when a certificate rotation is performed, certificates of containers that correspond to certificates that have been modified or replaced may themselves be modified or replaced, thereby enabling containers to have the correct digital certificate. Performing certificate rotations may enhance the security of containers as well as user devices utilized to access containers.

With the preceding context in mind, FIG. 1 is a block diagram of a container system 10. As illustrated, the container system 10 includes a client device 12, an administrator device 14, and a server 16 that implements a containerization engine 18. The client device 12 and administrator device 14 may each be any suitable computing device, such as a general or special-purpose personal computer, a laptop computer, a tablet computer, a mobile computer, a server, and the like that is configured in accordance with present embodiments. The client device 12 and administrator device 14 also may include various types of components that may assist the client device 12 and the administrator device 14 in performing various types of computer tasks and operations. For example, the client device 12 and administrator device 14 may include a processor, one or more databases, and a communication device. In addition, the client device 12 and administrator device 14 may each include memory, a display, input/output (I/O) ports, and the like. Furthermore, the server 16 may include one or more processors, input/output circuitry, memory, and storage, among other things. As such, one or more processors included in the client device 12, administrator device 14, or server 16 may execute software programs and/or instructions to facilitate determining and providing electronic services. Moreover, the one or more processors may include multiple microprocessors, one or more "general-purpose" microprocessors, one or more special-purpose microprocessors, and/or one or more application specific integrated circuits (ASICS), or some combination thereof. For example, the one or more processors may include one or more reduced instruction set (RISC) processors. The one or more memory devices may store information such as control software, look up tables, configuration data, databases, etc. The one or more memory devices may include a tangible, non-transitory, machine-readable-medium, such as a volatile memory (e.g., a random-access memory (RAM)) and/or a nonvolatile memory (e.g., a read-only memory (ROM)). The one or more memory devices may store a variety of information and may be used for various purposes. For example, the one or more memory devices may store machine-readable and/or processor-executable instructions (e.g., firmware or software) for the one or more processors, respectively, to execute, such as instructions for performing techniques described herein. The one or more memory devices may include one or more storage devices (e.g., nonvolatile storage devices) that may include read-only memory (ROM), flash memory, a hard drive, or any other suitable optical, magnetic, or solid-state storage medium, or a combination thereof.

The client device 12 and administrator device 14 may access the server 16 and containerization engine 18, for instance, via the Internet in order to access one or more containers 20 that are provided by the containerization engine 18. For example, users of the client device 12 or administrator device 14 may utilize the container 20 in order to run software that is available via the container, such as an operating system 22 and/or applications 24. Additionally, it should be noted that the administrator device 14 may be a client device 12 that has greater privileges. For instance, the administrator device 14 may have access to certain portions of the server 16 or containerization engine 18 that are otherwise unavailable to the client device 12. Furthermore, the administrator device 14 may have more privileges compared to the client device 12.

The server 16 may implement the containerization engine 18, for example, by utilizing one or more processors included in the server 16 to execute instructions stored on a non-transitory computer-readable medium. In other words, the containerization engine 18 may be software that is implemented via a computing device, such as the server 16, that is communicatively coupled to other computing devices, such as the client device 12 and administrator device 14 (e.g., via the Internet). The containerization engine 18 may provide the container 20 to the client device 12 and administrator device 14, for example, in response to a request from the client device 12 or administrator device 14. More specifically, the container 20 may be a software image, and the client device 12 and administrator device 14 may execute software that enables an application to utilize the software image of the container 20 to implement the container 20.

Each container 20 included in the containerization engine 18 may include communication infrastructure 26 that enables the container 20 to communicate with the client device 12 and administrator device 14. For example, communication between the container 20 and other devices (e.g., the client device 12 and/or administrator device 14) may occur via secured or encrypted communication channels over the Internet according to a public key infrastructure. Digital certificates 28 utilized by the containers 20 may be included in the communication infrastructure 26 or stored in storage 30 and utilized by the communication infrastructure 26 to enable encrypted communication to occur. For example, the containers 20 or applications 24 provided by the containers 20 may communicate using Hypertext Transfer Protocol Secure (HTTPS) or other communication protocols that utilize the digital certificates 28.

The digital certificates 28 may be generated by certificate generators 32A, 32B. In particular, the certificate generator 32A may be software instructions executed by the server 16, while the certificate generator 32B may, for instance, be a server separate from the server 16 that includes circuitry that executes instructions to generate digital certificates. Both of the certificate generators 32A, 32B may be communicatively coupled to the containerization engine 18, the client device 12, and the administrator device 14 and provide certificates to the client device 12, administrator device 14, and server 16 (including the containerization engine 18 and the containers 20). While the container system 10 is illustrated as including both certificate generators 32A, 32B, it should be noted that, in other embodiments, only one of the certificate generators 32A, 32B may be included. For example, an entity that provides the containerization engine 18 may not provide digital certificates. In such a case, the server 16 may not include the certificate generator 32B.

The containers 20 may also include an operating system 22 and one or more applications 24 that may be executed by the operating system 22. In other words, the applications 24 may include software that is run using the operating system 22. As an example, a user of the client device 12 may access the container 20 to work on a file or project that can be accessed using a program (e.g., one of the applications 24). As a user utilizes an application (e.g., a web browser or other software that utilizes the Internet) provided by a container, digital certificates 28 may be obtained. As noted above, the digital certificates 28 may be stored in the communication infrastructure 26 of the container or the digital certificates 28.

Users who access that containers 20 of the containerization engine 18 may have different credentials, such as usernames and passwords, that enable the users to gain access to the container 20 and/or files executable via the applications 24. The containerization engine 18 may include a container management module 34 that manages the containers 20. For example, the container management module 34 may manage the user credentials associated with different users and keep track of the particular containers 20 that each user is associated with or to whom access should be granted.

Additionally, the container management module 34 may generate metadata, such as tags, that can be applied to (e.g., associated with) the digital certificates 28 using a tag generator 36. The metadata may describe a particular certificate (e.g., indicate what the digital certificate is for, a version of the digital certificate, etc.), a particular container 20 (e.g., to indicate a particular digital certificate was obtained by a particular container 20), a particular application 24 (e.g., to indicate a particular digital certificate was obtained by or is used with a particular application 24), or a combination thereof. For example, as discussed below, metadata can be associated with certificates in order to keep track of the digital certificates that a particular container has obtained. The metadata may also be used to keep track of which digital certificates a particular user has obtained.

The containerization engine 18 may also include the digital certificates 28, which can be utilized to store data associated with the containers 20. The storage may include a tag database 38 which may keep track of metadata (e.g., tags) that has been associated with digital certificates. For example, the tag database 38 may indicate relationships between digital certificates, tags, containers, and users. As described below, the containerization engine 18 may utilize the tag database 38 to perform certificate rotations.

The administrator device 14 may have privileges that users of the client device 12 may not have. For example, the administrator device 14 may be a device utilized by an administrator of the containerization engine 18, and a user account of ID associated with the administrator may have access to different features or functions provided by the containerization engine 18. In particular, the administrator device 14 may send a command to the containerization engine 18 to cause the containerization engine to perform certificate rotations.

Before proceeding to discuss FIG. 2, it should be noted that the containerization engine 18 (and components thereof) and certificate generator 32B may be implemented via a processor of the server 16 executing software instructions that are stored on a non-transitory computer readable medium, such as a hard drive. In other words, the containerization engine 18 and certificate generator 32B may not be physical components included in the server, but rather software elements that can be executed by the server 16.

Keeping the discussion of FIG. 1 in mind, FIG. 2 is a flow diagram of a process 70 for managing certificates associated with the containers 20 of the containerization engine 18. The process 70 may be performed by the containerization engine 18, for example, when the administrator device 14 interacts with the containerization engine 18 to cause the process 70 to be implemented.

At process block 72, the containerization engine 18 may determine digital certificates associated with one or more of the containers 20. For example, the containerization engine 18 may search the containers 20 and/or digital certificates 28 for files or data types (e.g., .cer or other file extensions used for digital certificates) that may be digital certificates. In some cases, the containerization engine 18 may determine the digital certificates associated with a container 20 or a particular user, for example, whenever the container 20 is used or the particular user accesses the container 20. As such, the containerization 18 may determine digital certificates associated with one or more of the containers 20 as well as digital certificates associated with a particular user of one of more of the containers 20.

At process block 74, the containerization engine 18 may apply metadata to the digital certificates. For example, as described above, the metadata may include tags that are generated via the tag generator 36 of the container management module 34 of the containerization engine 18.

At process block 76, the containerization engine 18 may generate a hash table, which may be the tag database 38 or be included in the tag database 38 of the digital certificates 28. In particular, the hash table may be a data table that includes several entries, and each entry may indicate an association between a particular certificate, particular metadata, and information identifying a user, such as a username, a user ID, or a user's real name. In other words, the tag database 38 may indicate which certificates a particular user has.

At process block 78, the containerization engine 18 may cause a certificate rotation to be performed. As an example, a certificate rotation may include replacing one certificate with another certificate. As described below, because the tag database 38 indicates which certificates each user has or is otherwise associated with, when a certificate is modified or changed for another certificate, the containerization engine 18 may modify or update certificates associated with the containers 20.

To help elaborate on performing certificate rotations, FIG. 3 is provided. In particular, FIG. 3 is a flow diagram of a process 90 for performing certificate rotations involving the containers 20. The process 90 may be performed by the containerization engine 18. For example, the administrator device 14 may cause the process 90 to be implemented via the containerization engine 18 to cause one or more digital certificates associated with the containers 20 to be rotated.

At process block 92, the containerization engine 18 may determine relationships based on the hash table (e.g., tag database 38). For instance, as noted above, the tag database 38 (or a hash table included therein) may indicate the digital certificates found in the containers 20, the metadata (e.g., tags) applied to the digital certificates, and the users associated with the digital certificates. In other words, at process block 92, the containerization engine 18 may determine which certificates and tags are associated with each user. The containerization engine 18 may also search for particular tags in order to find specific containers and/or users. For example, the same tag may be applied to each copy of the same certificate. Accordingly, because the tag database 38 would indicate which certificate is associated with a particular tag, when the containerization engine 18 searches for a particular tag, the containerization engine 18 may identify particular containers 20 (or portions thereof) that have or are associated with a specific digital certificate. Likewise, a common tag may also be used for each user. Accordingly, to find all certificates associated with a particular user, the containerization engine 18 may also search the tag database 38 for the tag associated with a particular user.

At process block 94, the containerization engine 18 may cause one or more existing certificates to be modified. For example, the containerization engine 18 may provide or request certificates for containers 20 that have certificates that have expired, been modified, replaced, or deleted (e.g., based on, or in response to, determining that such certificates have expired, been modified, replaced, or deleted). For instance, if a first certificate is modified to become a second certificate, the containerization engine 18 may update the digital certificates of the containers 20 that are the first certificate by changing the digital certificates to the second certificate.

At process block 96, the containerization engine 18 may update metadata, such as metadata in the containers 20 that is associated with particular certificates. For example, names of tags associated with digital certificates that have been modified may also be modified. As another example, continuing with the scenario in which first certificate is modified to become a second certificate and the second certificate is obtained for use by the containers 20, new metadata may be associated with the second certificate. Additionally, the tag database 38 may be updated to indicate the relationship between the second certificate and the metadata. For example, the tag database 38 may be modified to indicate that a user now has the second certificate and that the user, second certificate, or both the user and the second certificate are associated with particular metadata (e.g., one or more tags).

Accordingly, the techniques discussed herein enable containerization systems such as the containerization engine 18 to implement certificate rotations in containers. For example, because certifications for particular containers and/or users associated with particular containers can be mapped by applying tags to certificates and maintaining a tag database, when digital certificates are changed or replaced, the location of modified certificates (and users having the modified certificates) is known, and the modified certificates can be updated or replaced (e.g., with a newer certificate). By allowing digital certificates to be rotated, containers may be more secure. For example, because expired or old certificates can be updated, communication involving the containers is more likely to use secure (e.g., encrypted) pathways, thereby reducing the susceptibility of the containers (and containerization engine) to being hacked.

Exemplary embodiments discussed herein are not limited to the specific embodiments described herein, but rather, components of systems and/or steps of the methods may be utilized independently and separately from other components and/or steps described herein. For example, the methods, systems, and apparatus may also be used in combination with other systems and are not limited to practice with only the systems and methods as described herein. Rather, the exemplary embodiment can be implemented and utilized in connection with many other applications, equipment, and systems that may benefit certificate management and rotation.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A containerization engine configured to:
   host one or more containers that use one or more software images to virtualize software while refraining from virtualizing hardware;
   determine one or more digital certificates associated with the one or more containers;
   apply metadata to the one or more digital certificates;
   generate a database comprising a plurality of entries, wherein each of the plurality of entries is indicative of a relationship between at least a portion of the metadata, a digital certificate of the one or more digital certificates, and a user of the one or more containers; and
   perform a certificate rotation using the database.

2. The containerization engine of claim 1, wherein the containerization engine is configured to perform the certificate rotation by:
   causing at least one of the one or more digital certificates to be modified; and
   updating the database based on the at least one of the one or more digital certificates being modified.

3. The containerization engine of claim 2, wherein the containerization engine is configured to cause the at least one of the one or more digital certificates to be modified by causing the at least one of the one or more digital certificates to be replaced by a different digital certificate.

4. The containerization engine of claim 3, wherein the containerization engine is configured to update the database by modifying an entry of the plurality of entries to be indicative of a relationship between the portion of the metadata, the different digital certificate, and the user.

5. The containerization engine of claim 1, wherein the metadata comprises one or more tags.

6. The containerization engine of claim 1, wherein the one or more digital certificates enable encrypted communication to occur between the one or more containers and an electronic device of the user.

7. The containerization engine of claim 1, wherein:
   the containerization engine is implemented utilizing a first computing device; and
   a first portion of the one or more digital certificates is generated by a second computing device different from the first computing device.

8. The containerization engine of claim 7, wherein a second portion of the one or more certificates is generated by the first computing device.

9. A non-transitory computer-readable medium comprising instructions that, when executed by one or more processors, cause the one or more processors to:
   host one or more containers that use one or more software images to virtualize software while refraining from virtualizing hardware;
   determine one or more digital certificates associated with the one or more containers;
   apply metadata to the one or more digital certificates;
   generate a database comprising a plurality of entries, wherein each of the plurality of entries is indicative of a relationship between at least a portion of the metadata, a digital certificate of the one or more digital certificates, and a user of the one or more containers; and
   perform a certificate rotation using the database.

10. The non-transitory computer-readable medium of claim 9, wherein the instructions, when executed by the one or more processors, cause the one or more processors to perform the certificate rotation by:
    determining the digital certificate has expired; and
    causing the digital certificate to be replaced by a new digital certificate.

11. The non-transitory computer-readable medium of claim 10, wherein the instructions, when executed by the one or more processors, cause the one or more processors to update, after causing the digital certificate to be replaced by the new digital certificate, the database by modifying an entry of the plurality of entries to be indicative of a relationship between the portion of the metadata, the new digital certificate, and the user.

12. The non-transitory computer-readable medium of claim 9, wherein the one or more digital certificates enable encrypted communication to occur between the one or more containers and an electronic device of the user.

13. The non-transitory computer-readable medium of claim 9, wherein the instructions, when executed by the one or more processors, cause the one or more processors to perform the certificate rotation by:
    determining the digital certificate has been deleted; and
    requesting a new digital certificate.

14. The non-transitory computer-readable medium of claim 9, wherein the metadata comprises one or more tags.

15. The non-transitory computer-readable medium of claim 14, wherein the one or more tags comprise a common tag associated with the user that is applied to more than one digital certificate.

16. A computer-implemented method, comprising:
    hosting, via one or more processors, one or more containers that use one or more software images to virtualize software while refraining from virtualizing hardware;
    determining, via the one or more processors, one or more digital certificates associated with the one or more containers;
    applying, via the one or more processors, metadata to the one or more digital certificates;
    generating, via the one or more processors, a database comprising a plurality of entries, wherein each of the plurality of entries is indicative of a relationship between at least a portion of the metadata, one digital certificate of the one or more digital certificates, and a user of the one or more containers; and
    performing, via the one or more processors, a certificate rotation using the database.

17. The computer-implemented method of claim 16, wherein performing the certificate rotation comprises:
    determining a first digital certificate has been replaced by a second digital certificate; and
    replacing each of the one or more digital certificates corresponding to the first digital certificate with the second digital certificate.

18. The computer-implemented method of claim 17, wherein performing the certificate rotation comprises:

applying second metadata to the second digital certificate; and modifying one or more entries of the plurality of entries to be indicative of a relationship between the portion of the metadata, the second digital certificate, and the user.

19. The computer-implemented method of claim 16, wherein performing the certificate rotation comprises:

modifying the one digital certificate to generate a modified digital certificate; and modifying at least a portion of the metadata associated with the digital certificate to generate modified metadata, wherein the modified digital certificate comprises the modified metadata.

20. The computer-implemented method of claim 19, wherein performing the certificate rotation comprises modifying one or more entries of the plurality of entries to be indicative of a relationship between the modified metadata, the modified digital certificate, and the user.

* * * * *